(12) United States Patent
Tokairin et al.

(10) Patent No.: US 11,141,783 B1
(45) Date of Patent: Oct. 12, 2021

(54) CYLINDER LINER FOR INSERT CASTING

(71) Applicants: TPR Co., Ltd., Tokyo (JP); TPR Industry Co., Ltd., Yamagata (JP)

(72) Inventors: Yasutomo Tokairin, Yamagata (JP); Koichi Hatakeyama, Yamagata (JP); Kiyoyuki Kawai, Tokyo (JP)

(73) Assignees: TPR Co., Ltd., Tokyo (JP); IPR Industry Co., Ltd., Yamagata (JP)

( * ) Notice: Subject to any disclaimer, the term of this patent is extended or adjusted under 35 U.S.C. 154(b) by 0 days.

(21) Appl. No.: 17/246,799

(22) Filed: May 3, 2021

Related U.S. Application Data

(63) Continuation-in-part of application No. PCT/JP2020/024707, filed on Jun. 24, 2020.

(51) Int. Cl.
*B22D 19/00* (2006.01)
*B22D 19/08* (2006.01)
*F02F 1/00* (2006.01)
*F16J 10/04* (2006.01)

(52) U.S. Cl.
CPC ......... *B22D 19/0009* (2013.01); *B22D 19/08* (2013.01); *F02F 1/004* (2013.01); *F02F 2200/06* (2013.01); *F16J 10/04* (2013.01)

(58) Field of Classification Search
CPC ..... B22D 19/0009; B22D 19/08; F02F 1/004; F02F 2200/06; F16J 10/04
See application file for complete search history.

(56) References Cited

U.S. PATENT DOCUMENTS

| | | | |
|---|---|---|---|
| 2001/0004498 A1 | 6/2001 | Saito | |
| 2005/0161187 A1* | 7/2005 | Kodama | F02F 7/00 164/66.1 |
| 2007/0240652 A1 | 10/2007 | Michioka et al. | |
| 2009/0272261 A1 | 11/2009 | Sato et al. | |

(Continued)

FOREIGN PATENT DOCUMENTS

| | | |
|---|---|---|
| JP | H08-290255 A | 11/1996 |
| JP | 2001-170755 A | 6/2001 |

(Continued)

OTHER PUBLICATIONS

International Search Report and Written Opinion issued in PCT/JP2020/024707 dated Aug. 4, 2020.

(Continued)

*Primary Examiner* — Syed O Hasan
(74) *Attorney, Agent, or Firm* — Marshall, Gerstein & Borun LLP

(57) ABSTRACT

An object of the present invention is to provide a cylinder liner for insert casting that can improve the joining strength between a cylinder liner and a cylinder block by reducing voids generated between the cylinder liner and the cylinder block.
The above-described problem can be solved when the molten metal running index YI defined by the following Formula (1) is from 2.2 to 14.5.

Molten metal running index $YI$=[area ratio $S_t$ (%) of top portions of protrusions×molten metal infiltration volume $V$ (mm$^3$)/surface area $A$ (mm$^2$) of cylinder liner base]/average surface-to-surface distance $P_{av}$ between top portions of protrusions (mm)     (1).

6 Claims, 7 Drawing Sheets

(56) References Cited

U.S. PATENT DOCUMENTS

2019/0358701 A1    11/2019  Sayama et al.
2020/0392921 A1*   12/2020  Sato .................. B22D 19/0009

FOREIGN PATENT DOCUMENTS

| JP | 2003-326346 A | 11/2003 |
|----|---------------|---------|
| JP | 2005-194983 A | 7/2005 |
| JP | 2008-138552 A | 6/2008 |
| JP | 2009-264347 A | 11/2009 |
| JP | 6340148 B1 | 6/2018 |
| WO | WO-2019/097678 A1 | 5/2019 |
| WO | WO-2019/225039 A1 | 11/2019 |

OTHER PUBLICATIONS

Decision to Grant a Patent issued in corresponding Japanese Patent Application No. 2020-544886 dated Sep. 29, 2020.

* cited by examiner

CYLINDER LINER FOR INSERT CASTING

CROSS-REFERENCE TO RELATED APPLICATION

This is a continuation-in-part of International Application PCT/JP2020/024707, filed on Jun. 24, 2020, and designating the U.S.

TECHNICAL FIELD

The present invention relates to a cylinder liner, and particularly to a cylinder liner for insert casting which is cast in a cylinder block to form a cylinder inner wall.

BACKGROUND OF THE INVENTION

When manufacturing a cylinder block to be applied to an automobile engine, a cylinder liner is arranged on the inner circumference of the cylinder. Examples of a method of manufacturing a cylinder block in which a cylinder liner is arranged include a method in which a cylinder liner is arranged in advance in a mold for a cylinder block, a casting material is poured into the mold, and the outer periphery of the cylinder liner is wrapped with the casting material.

As such a cylinder liner, which is arranged in advance in a mold in manufacturing a cylinder block, what includes a plurality of protrusions on the outer periphery of the cylinder liner in order to improve the joining strength with the cylinder block is known (see, for example, Patent Documents 1 and 2).

With respect to a plurality of protrusions on the outer periphery of a cylinder liner, a technique for improving the joining strength and adhesion with a cylinder block by focusing on protrusions having a constricted shape is known (see, for example, Patent Document 3).

CITATION LIST

Patent Documents

Patent Document 1 Japanese Unexamined Patent Application Publication No. 2005-194983
Patent Document 2 Japanese Unexamined Patent Application Publication No. 2009-264347
Patent Document 3 U.S. Pat. No. 6,340,148

SUMMARY OF INVENTION

Technical Problem

As described above, an attempt is made to improve the joining strength between a cylinder liner and a cylinder block by providing protrusions on the outer periphery of a cylinder liner base and making the protrusions constricted in shape.

On the other hand, when manufacturing a cylinder block, a casting material is poured into a mold of the cylinder block in which a cylinder liner is arranged, and the periphery of the cylinder liner is wrapped with the casting material. In such cases, the casting material poured into the mold is sometimes not sufficiently distributed to a protrusion-to-protrusion area on the outer periphery of the cylinder liner base. Such phenomena particularly tend to occur when gravity casting or low-pressure permanent mold casting is carried out, and even when high-pressure permanent mold casting is carried out, such phenomena are occasionally observed in areas where it is difficult for molten metal to run, such as between cylinders. As a result, it was realized that the joining strength was not sufficient in some cases due to the formation of a void at a joint portion between the outer periphery of the cylinder liner and the cylinder block. The cylinder liner base herein means a cylinder liner main body portion having approximately a cylindrical shape, which is a cylinder liner excluding the protrusions.

An object of the present invention is to provide a cylinder liner for insert casting that can improve the joining strength between the cylinder liner and a cylinder block by suppressing a void generated at a joint portion between the outer periphery of a cylinder liner base and the cylinder block.

Solution to Problem

In order to solve the above-described problems, the present inventors focused on the distance between adjacent protrusions, the area of top portions of protrusions, and a space between top portions of protrusions of a cylinder liner and the outer periphery of a base, regarding the property of protrusions existing on the outer periphery of a cylinder liner base. This is a finding from experiments conducted by the present inventors.

Specifically, FIG. 6 illustrates running of molten metal between a conventional art cylinder liner and a cylinder block. The upper side of the figure indicates a casting material and the lower side indicates a cylinder liner, and the casting material flowed from the right to the left in the figure. As is clear from FIG. 6, it was confirmed that when the casting material flowed on the surface of the cylinder liner, there was a portion where the casting material did not reach the outer periphery of the cylinder liner base, where a void was generated.

The present inventors found that by appropriately controlling the distance between adjacent protrusions, the area of top portions of protrusions, and a space between top portions of protrusions of a cylinder liner and the outer periphery of a cylinder liner base, molten metal (referring to a casting material in a molten state) can be distributed to an protrusion-to-protrusion area on the outer periphery of the cylinder liner base, and voids generated at an interface with a cylinder block can be reduced, thus improving the joining strength between the cylinder liner and the cylinder block, even when gravity casting is used, thereby completing the present invention. Specifically, FIG. 7 illustrates running of molten metal between the cylinder liner of the present invention and a cylinder block. As with FIG. 6, the upper side of the figure indicates a casting material and the lower side indicates a cylinder liner, and the casting material flowed from the right to the left in the figure. As is clear from FIG. 7, in the case of the cylinder liner by the present inventors, voids between a casting material (cylinder block) and the cylinder liner were reduced.

The present invention is a cylinder liner for insert casting including a base and a plurality of protrusions on the outer periphery of the base, wherein the molten metal running index YI defined by the following Formula (1) is 2.2 or more and 14.5 or less.

Molten metal running index $YI$=[area ratio $S_r$ (%) of top portions of protrusions×molten metal infiltration volume $V$ (mm³)/outer peripheral surface area $A$ (mm²) of cylinder liner base]/average surface-to-surface distance $P_{av}$ (mm) between top portions of protrusions  (1)

In Formula (1), the area ratio $S_r$ of the top portions of the protrusions is the projected area ratio of the protrusions viewed from the outer peripheral side of the cylinder liner in the height direction of the protrusions, and in the case of constricted protrusions, the area ratio St is the area ratio of portions corresponding to the maximum diameter of the protrusions near the tip.

In Formula (1), the molten metal infiltration volume V is represented by $V=\alpha-\beta-(\gamma\times\delta)$, where
$\alpha=\pi\times$(outermost diameter $d_{max}$ (mm) of cylinder liner including protrusions/2)$^2\times$axial length L (mm) of cylinder liner, $\beta=\pi\times$(outer diameter d (mm) of cylinder liner base/2)$^2\times$ axial length L (mm) of cylinder liner, $\gamma=$Number of protrusions per unit area$\times$[(outer diameter d (mm) of cylinder liner base$\times\pi\times$axial length L (mm) of cylinder liner)/unit area (mm$^2$)], and $\delta=\pi\times$(average diameter $d_{pav}$ (mm) of top portion of protrusion/2)$^2\times$average protrusion height $H_{av}$ (mm).

When either or both ends of the cylinder liner are chamfered, the axial length L of the cylinder liner is defined as the length of the cylinder liner minus the length of the chamfered portions.

In the Formula (1), the area ratio St (%) of the top portions of the protrusions is preferably from 8 to 35, the average surface-to-surface distance $P_{av}$ (mm) between the top portions of the protrusions is preferably from 0.7 to 2.3, the molten metal infiltration volume V (mm$^3$)/the outer peripheral surface area A (mm$^2$) of the cylinder liner base is preferably from 0.3 mm to 0.7 mm, and the average diameter $d_{pav}$ (mm) of the top portion of the protrusion is preferably from 0.7 to 1.3.

The plurality of protrusions preferably have a height variation $\Delta H$ (mm) of 0.3 or less, and the plurality of protrusions preferably have a surface roughness Rz (μm) of the top portion of the protrusions of 100 or less.

Advantageous Effects of Invention

By using the cylinder liner of the present invention, a molten metal which is poured into a mold can be spread between protrusions on the outer periphery of the cylinder liner, and voids generated at an interface with a cylinder block can be reduced, thereby improving the joining strength between the cylinder liner and the cylinder block. In particular, even in the case of a cylinder block manufactured by a gravity casting method, which is considered to be difficult to distribute molten metal, voids generated at an interface with the cylinder liner and the cylinder block can be reduced.

DESCRIPTION OF EMBODIMENTS

One embodiment according to the present invention is a cylinder liner for insert casting including a base and a plurality of protrusions on the outer periphery of the base, wherein the molten metal running index YI defined by the following Formula (1) is from 2.2 to 14.5.

molten metal running index $YI$=[area ratio $S_t$ (%) of top portions of protrusions$\times$molten metal infiltration volume $V$ (mm$^3$)/outer peripheral surface area $A$ (mm$^2$) of cylinder liner base]/average surface-to-surface distance $P_{av}$ (mm) between top portions of protrusions     (1)

A plurality of constricted protrusions are present on the outer periphery of a cylinder liner base. The thickness of the constricted protrusion gradually decreases from the outer periphery of the cylinder liner base in the height direction and takes a minimum value, and then gradually increases to reach a maximal value. Such a protrusion is herein referred to as a constricted protrusion.

The percentage of constricted protrusions among protrusions existing on the outer periphery of a cylinder liner base (hereinafter also referred to as protrusion constriction rate) is preferably 50% or more, may be 60% or more, may be 70% or more, may be 80% or more, may be 90% or more, and may be 100%. A given number of protrusions on the outer periphery of a cylinder liner base are observed, and the ratio of the number of constricted protrusions to the observed number of protrusions is defined as the protrusion constriction rate.

The molten metal running index YI is an index for a plurality of protrusions existing on the outer periphery of a cylinder liner base to appropriately control the distance between adjacent protrusions, the area ratio of top portions of protrusions, and the space between the plane in contact with the top portion of the protrusions of the cylinder liner and the outer periphery of the cylinder liner base. When the molten metal running index YI is within the above-described range, a molten metal can be distributed to a protrusion-to-protrusion area of the outer periphery of a cylinder liner base, and voids generated at an interface with a cylinder block can be reduced, thereby improving the joining strength between the cylinder liner and the cylinder block. The molten metal running index will be described with reference to drawings.

Figure 1:
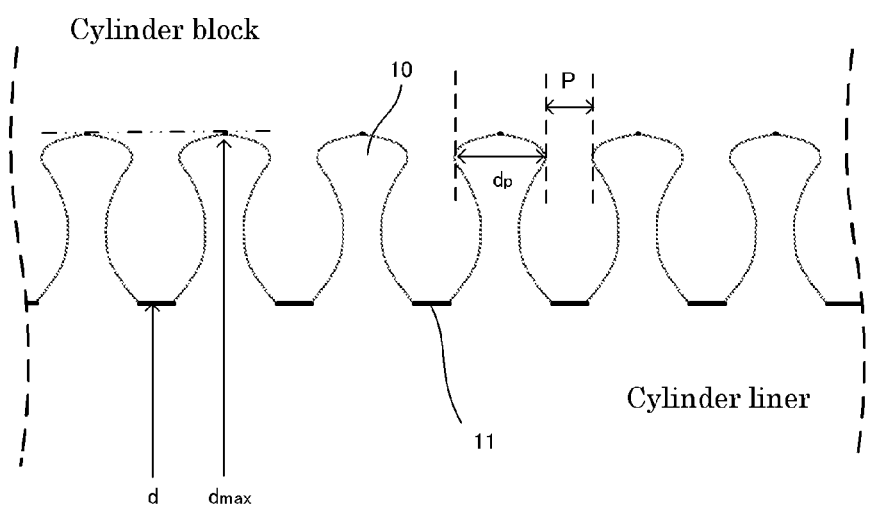
FIG. 1 is a schematic sectional view of a joint portion of a cylinder liner and a cylinder block.

FIG. 1 is a sectional view schematically illustrating a joint portion of a cylinder liner and a cylinder block. The upper portion of the drawing is the cylinder block and the lower portion of the drawing is the cylinder liner.

A plurality of constricted protrusions 10 exist on the outer periphery 11 of the cylinder liner base, and a casting material constituting a cylinder block enters between the plurality of constricted protrusions, thereby making top portion of the constricted protrusions on the outer periphery of the cylinder liner and the cylinder block in a key-keyhole relationship to achieve a strong joining.

Figure 4:
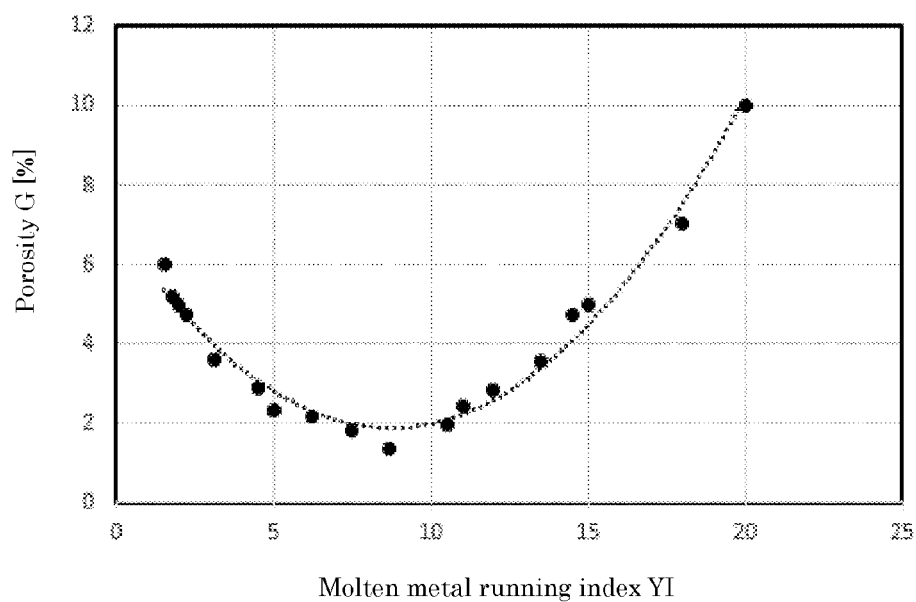
FIG. 4 is a graph showing the relationship between the molten metal running index YI and the porosity.

On the other hand, joining of a cylinder liner and a cylinder block is accomplished by pouring molten metal into the outer periphery of the cylinder liner base arranged in a mold. In this process, depending on how a plurality of constricted protrusions exist on the outer periphery of the cylinder liner base, the molten metal may not be distributed between the protrusions. In the present embodiment, by setting the above-described molten metal running index YI within a specific range, a molten metal which is poured into a mold can be distributed also between protrusions, and voids generated in a cylinder block can be reduced, thereby improving the joining strength between the cylinder liner and the cylinder block. In particular, even for a cylinder block manufactured by the gravity casting method, which is considered to be difficult for molten metal to be distributed to every corner of the cylinder block, molten metal is distributed also between the protrusions on the outer periphery of the cylinder liner. FIG. 4 illustrates a relationship between the molten metal running index YI and the porosity, which was found in Examples described below.

Figure 5:
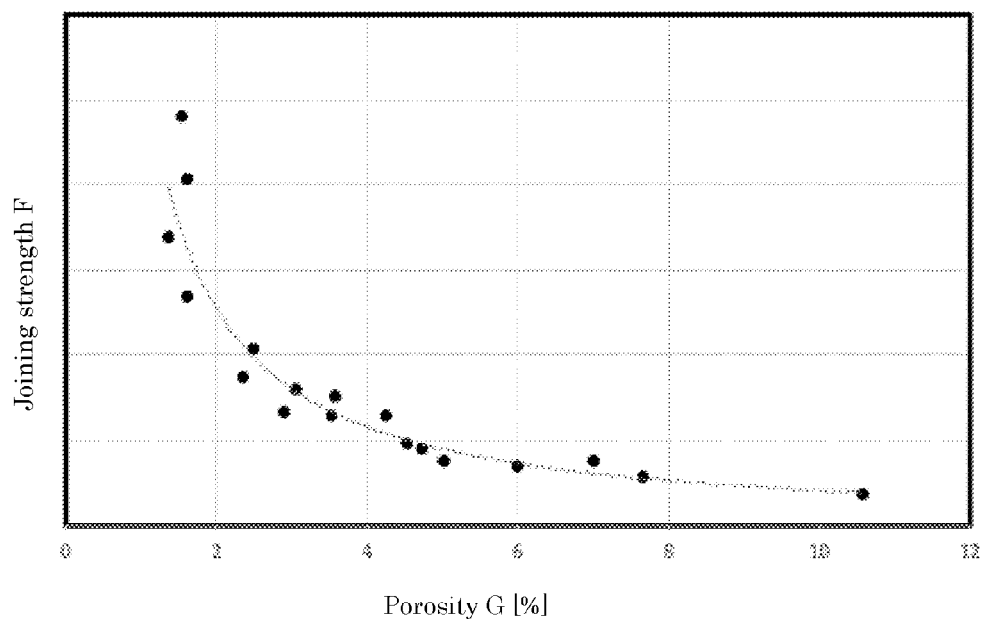
FIG. 5 is a graph showing the relationship between the porosity and the joining strength.
Figure 6:
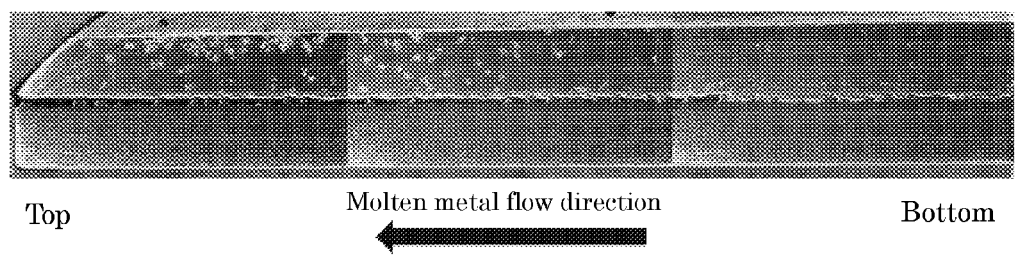
FIG. 6 is a photograph of molten metal running between a cylinder liner of a conventional technique and a cylinder block (photograph substitute for drawing).
Figure 7:
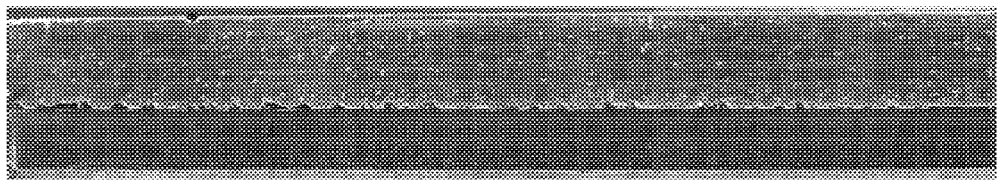
FIG. 7 is a photograph of molten metal running between the cylinder liner of the present invention and the cylinder block (photograph substitute for drawing).

When the molten metal running index YI is greater than the above-described upper limit, a molten metal does not infiltrate between protrusions, and a void is generated between a cylinder liner and a cylinder block, which results in insufficient joining strength and insufficient heat transfer capability to transfer heat generated in a combustion chamber to cooling water. On the other hand, when the molten metal running index YI is lower than the above-described lower limit, the molten metal temperature decreases due to the molten metal being in contact with the outer periphery of the cylinder liner base at an early stage without sufficient flow over the protrusions, and the flow of molten metal is inhibited. As a result, it was newly found that the molten metal was not distributed to every corner and voids were generated between the cylinder liner and the cylinder block, resulting in insufficient joining strength. FIG. 5 illustrates the relationship between the porosity and the joining strength, which was found in the Examples described below.

In FIG. 1, the plurality of protrusions 10 on the outer periphery 11 of the cylinder liner base has a relatively large diameter $d_p$ of the top portion of the protrusion and a relatively small protrusion-to-protrusion distance P, and therefore the plurality of protrusions are densely arranged on the outer periphery 11 of the cylinder liner base. As a result, due to resistance caused by the viscosity and the surface tension of the molten metal, the molten metal is difficult to infiltrate between the protrusions. This leads to a vicious cycle in which molten metal takes time to infiltrate between the plurality of protrusions, and the molten metal cools and solidifies faster than the molten metal can infiltrate between the protrusions.

Figure 2:
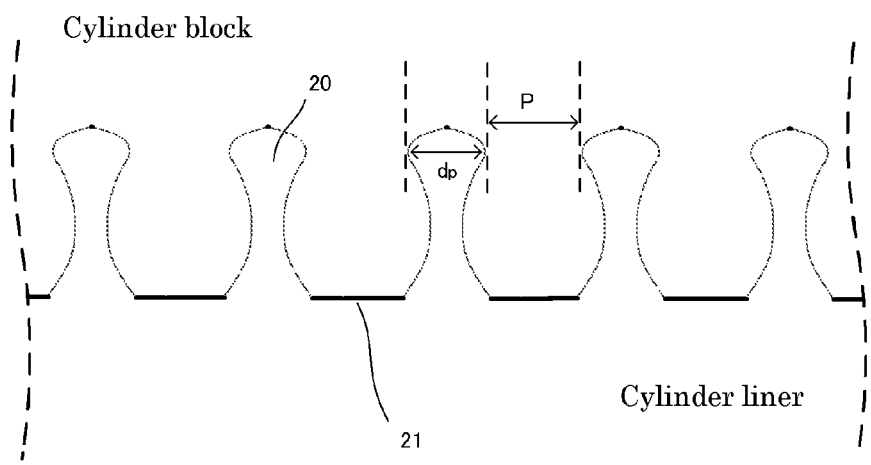
FIG. 2 is a schematic sectional view of a joint portion of a cylinder liner and a cylinder block.
Figure 3:
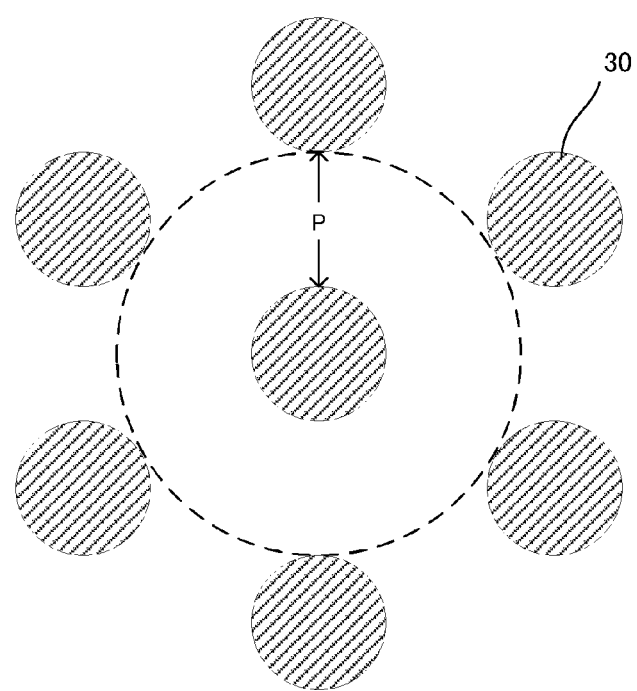
FIG. 3 is a schematic diagram illustrating a protrusion on the outer periphery of a cylinder liner that is coordinated with six adjacent protrusions.

On the other hand, in FIG. 2, since the plurality of protrusions 20 on the outer periphery 21 of the cylinder liner base has a relatively small diameter $d_p$ of the top portion of the protrusion and the protrusion-to-protrusion distance P is relatively large, the plurality of protrusions are arranged in low density with wide intervals on the outer periphery 21 of the cylinder liner base. As a result, the molten metal easily infiltrates between the protrusions on the way of sliding and flowing on the plurality of protrusions and touches the outer periphery of the cylinder liner base, causing the molten metal to cool down. As a result, the molten metal does not flow to every corner of the cylinder liner.

In other words, a cylinder liner which has an optimal arrangement of protrusions to allow molten metal to infiltrate between the protrusions in accordance with the viscosity and the surface tension of molten metal, needed to be developed.

In Formula (1), the area ratio $S_t$ (%) of the top portions of the protrusions is the projected area ratio of the protrusions viewed from the outer peripheral side of the cylinder liner in the height direction of the protrusions, and in the case of constricted protrusions, the area ratio $S_t$ is the area ratio of portions corresponding to the maximal diameter of the protrusions near the tip. The area ratio $S_t$ of the top portions of the protrusions is preferably 8 or more, and more preferably 10 or more, and is preferably 35 or less, and more preferably 30 or less. When the area ratio $S_t$ of the top portions of the protrusions is within the above-described range, the molten metal can easily infiltrate between the protrusions, and the molten metal can be prevented from cooling down through contact with the outer periphery of the cylinder liner base at an early stage.

In Formula (1), the molten metal infiltration volume V (mm$^3$) is represented by V=α−β−(γ× δ), where α=π×(outermost diameter $d_{max}$ (mm) of cylinder liner including protrusions/2)$^2$×axial length L (mm) of cylinder liner, β=π× (outer diameter d (mm) of cylinder liner base/2)$^2$×axial length L (mm) of cylinder liner, γ=Number of protrusions per unit area×[(outer diameter d (mm) of cylinder liner base×π×axial length L (mm) of cylinder liner)/unit area (mm$^2$)], and δ=π×(average diameter dpav (mm) of top portion of protrusion/2)$^2$×average protrusion height $H_{av}$ (mm).

The molten metal infiltration volume V (mm$^3$) represents the protrusion-to-protrusion area existing from the outer periphery of the cylinder liner base to the top portions of the protrusions. Therefore, the molten metal infiltration volume V is defined as the volume of a cylinder, whose cylinder diameter is defined as the outermost diameter $d_{max}$ (mm) of the cylinder liner including the protrusions, minus the volume of a cylinder, whose cylinder diameter is defined as the outer diameter d (mm) of the cylinder liner base, and then the product of the number (deemed number of protrusions) γ of the protrusions in the cylinder liner and the volume of protrusions (deemed volume of protrusions) when considering the protrusions to be cylindrical in shape.

Since the outer peripheral surface area A (mm$^2$) of the cylinder liner base is the outer peripheral surface area of a cylinder whose cylinder diameter is considered to be the outer diameter d (mm) of the cylinder liner base, and the molten metal infiltration volume V changes significantly depending on the diameter of the cylinder liner, the molten metal infiltration volume V was divided by the peripheral surface area A of the cylinder liner base, which was substantially standardized.

The number of protrusions per unit area is the number of protrusions present per 1 cm2 and is preferably 10 or more, and more preferably 15 or more, and is preferably 40 or less, and preferably 35 or less. When the number of protrusions per unit area is in this range, the surface protrusion-to-protrusion distance P can easily be set to an appropriate value.

The average diameter $d_{pav}$ (mm) of top portions of the protrusions is the diameter of a protrusion calculated from the average projected area of each protrusion viewed from the outer peripheral side of the cylinder liner in the height direction of the protrusion, which corresponds to the diameter of the maximal diameter of the top portion of the protrusion. The $d_{pav}$ is preferably 0.7 or more, and more preferably 0.8 or more, and is preferably 1.3 or less, and preferably 1.1 or less. When the average diameter $d_{pav}$ of the top portion of the protrusion is within the above-described range, the average surface-to-surface distance $P_{av}$ between the top portions of the protrusions can easily be set to an appropriate value.

The average protrusion height $H_{av}$ (mm) of is not particularly limited, and is usually 0.3 or more, and may be 0.4 or more, and may be usually 0.9 or less, and may be 0.7 or less.

The area ratio $S_r$, the average diameter $d_{pav}$, the average surface-to-surface distance $P_{av}$, and the average protrusion height $H_{av}$ can be measured by a 3D surface measuring instrument.

The molten metal infiltration volume V (mm³)/the outer peripheral surface area A (mm²) of the cylinder liner base is preferably 0.7 mm or less, and more preferably 0.66 mm or less, and the lower limit is preferably 0.3 mm or more. When the value of the molten metal infiltration volume V (mm³)/the outer peripheral surface area A (mm²) of the cylinder liner base is equal to or lower than the above-described upper limit, the molten metal easily infiltrates between the protrusions.

The average surface-to-surface distance $P_{av}$ (mm) between the top portions of the protrusions refers to the average of the distances between the top portions of adjacent protrusions. As illustrated in FIG. 1, the distance P between the top portions of the protrusions that can have a maximal diameter indicates the size of an inlet where molten metal flowing on the surface of the cylinder liner can infiltrate into a protrusion-to-protrusion area.

The average surface-to-surface distance $P_{av}$ (mm) between the top portions of the protrusions can be measured by the following method.

$d_{max}$ is the average value obtained by measuring a total of 6 points in the X and Y directions at three locations, a top, a middle, and a bottom of one cylinder liner, respectively, using a caliper. The measurement shall be performed with a caliper surely hanging on the tip of the protrusion.

The average surface-to-surface distance $P_{av}$ between the top portions of the protrusions is calculated by the procedure described in Examples below.

The cylinder liner of the present embodiment preferably further satisfies the following requirements in order to further improve infiltration of molten metal between protrusions when cast in a cylinder block.

The plurality of protrusions existing on the outer periphery of the cylinder liner base preferably have a height variation ΔH (mm) of 0.3 or less, and more preferably 0.25 or less. When the height variation ΔH (mm) of the protrusions is greater than the above, the flow of molten metal on the protrusions may be obstructed, which is undesirable. The smaller the height variation ΔH, the more desirable it is.

The height variation ΔH(mm), which can be measured with a 3D surface measuring instrument, is the difference between the maximum height of protrusions and the minimum height of protrusions in the observation field.

The plurality of protrusions existing on the outer periphery of the cylinder liner base preferably have a surface roughness Rz of the top portions of the protrusions of 100 μm or less, and more preferably 75 μm or less. The lower limit of the surface roughness Rz of the top portions of the protrusions is not particularly limited, and is substantially about 10 μm, and the smaller the surface roughness, the more preferable. The surface roughness Rsk of the plurality of the top portions of the protrusions is preferably less than 0 (a negative value).

When the surface roughness Rz of the top portions of the protrusions is greater than the above and/or when the surface roughness Rsk of the top portions of the protrusions is zero or positive, the flow of molten metal on the protrusions may be obstructed, which is not desirable.

The surface roughness Rz and Rsk of the top portions of the protrusions can be measured by laser microscopy.

An example of the manufacturing method of a cylinder liner of the present embodiment will now be described.

The composition of a cast iron used as a material for a cylinder liner is not particularly limited, and typically the following composition can be given as an example of a composition of flaky graphite cast iron equivalent to JIS FC250, taking into account the wear resistance, seizure resistance, and workability.

C: from 3.0 to 3.7% by mass
Si: from 2.0 to 2.8% by mass
Mn: from 0.5 to 1.0% by mass
P: 0.25% by mass or less
S: 0.15% by mass or less
Cr: 0.5% by mass or less
Balance: Fe and inevitable impurities The method of manufacturing a cylinder liner is not particularly limited, and may be gravity casting or centrifugal casting, but the centrifugal casting method is preferable and typically includes the following processes A to E.

<Process A: Suspension Preparation Process>

Process A is a process of preparing a suspension by blending a fire-resistant base material, a binder, and water in a predetermined ratio.

Diatomaceous earth is typically used as the fire-resistant base material, but other materials can be used as well. The content of diatomaceous earth in the suspension is typically from 15% by mass to 35% by mass, and the average particle size of the diatomaceous earth is typically from 0.02 mm to 0.035 mm.

Bentonite is typically used as the binder, but other materials can be used as well. The content of bentonite in the suspension is usually from 3% by mass to 9% by mass.

The content of water in the suspension is usually from 62% by mass to 80% by mass.

<Process B: Coating Agent Preparation Process>

Process B is a process in which a predetermined amount of a surfactant is added to the suspension prepared in Process A to prepare a coating agent.

The type of surfactant is not particularly limited, and one of known surfactants such as a cationic surfactant, an anionic surfactant, a nonionic surfactant, or an amphoteric surfactant, or a combination of two or more of these surfactants is used. The amount of the surfactant to be blended is usually from 0.003% by mass to 0.04% by mass.

<Process C: Coating Agent Application Process>

Process C is a process of applying a coating agent to the inner surface of a cylindrical mold as a template. The application method is not particularly limited, and typically a spray application is used. During application of a coating agent, it is desirable that the coating agent is applied in such a manner that a layer of the coating agent is formed with an approximately uniform thickness over the entire inner surface. It is desirable to apply a moderate centrifugal force by rotating the cylindrical mold during application of a coating agent and formation of a coating agent layer.

The thickness of the coating agent layer is preferably determined within a range of 1.3 to 1.8 times the height of the protrusions, but is not limited thereto. When the coating agent layer has such a thickness, the temperature of the mold is preferably 300° C. or less.

<Process D: Cast Iron Casting Process>

Process D is a process of casting cast iron into a mold including a dry coating agent layer in a rotating state. In this process, molten metal fills a recessed hole having a constricted shape of the coating agent layer described in the previous process, thereby forming a constricted protrusion on the surface of a cylinder liner. It is also desirable to apply moderate centrifugal force in this process.

<Process E: Retrieval and Finishing Process>

In Process E, the manufactured cylinder liner is retrieved from the mold, and the coating agent layer on the surface of the cylinder liner is removed from the cylinder liner by blasting, thereby completing the cylinder liner.

The cylinder liner is completed through the above processes. In order to obtain an appropriate value of the molten metal running index YI for the protrusions on the outer periphery of the cylinder liner base, it is needed that the spacing between the protrusions is moderately wide and the area ratio of the top portions of the protrusions is moderately large. As a result, by adjusting the amount of surfactant, lining thickness, mold temperature, and the like as appropriate, the protrusions on the outer periphery of the cylinder liner base can have a desired shape.

The surface roughnesses Rsk and Rz of the top portions of the protrusions can be set to appropriate values by adjusting the type of fire-resistant material and the particle size of the diatomaceous earth in the above Process E. By reducing the particle size of the media used in the blasting process, the surface roughness of the top portions of the protrusions can be reduced.

The cylinder liner of the present embodiment is joined with a cylinder block to become a composite. A known method can be employed to manufacture a composite, and one example of such method may include a process of preparing a mold for a cylinder block, a process of arranging the cylinder liner of the present embodiment in the prepared mold for the cylinder block, and a process of pouring molten metal into the mold for the cylinder block in which the cylinder liner is arranged to form the cylinder block.

By manufacturing a composite of the cylinder liner of the present embodiment and a cylinder block, the protrusion-to-protrusion distance and the protrusion area ratio of the outer periphery of the cylinder liner base are within appropriate ranges, and therefore, the molten metal that forms the cylinder block slides on the protrusions of the cylinder liner without touching the outer periphery of the cylinder liner base at an early stage to cool down the molten metal, and spreads to every corner of the mold for the cylinder block. The molten metal also spreads between the protrusions on the outer periphery of the cylinder liner base, which reduces voids at an interface between the cylinder liner and the cylinder block and improves the joining force between the cylinder liner and the cylinder block. In a composite of a cylinder liner and a cylinder block, from the viewpoint of obtaining favorable joining force, the porosity of the cylinder block is preferably 5.0% or less, more preferably 4.8% or less, still more preferably 4.0% or less, and particularly preferably 3.0% or less. The lower limit is not particularly limited, and is usually 0% or more.

EXAMPLES

The present invention will be described in more detail by means of Examples, but it goes without saying that the scope of the present invention is not limited by the following Examples.

The methods for measuring the physical properties of the cylinder liners used in Examples are as follows.

<Measurement of Protrusion Constriction Rate>

The constriction rate of the protrusions was calculated by using a microscope (KH-1300, a digital microscope manufactured by HIROX CO., LTD.) and observing any 20 protrusions from an oblique direction and determining the number of protrusions which were found to be constricted. The average of the four locations measured per cylinder liner was used as the constriction rate.

<Area Ratio $S_t$ of Top Portions of Protrusions and Average Diameter $d_{pav}$ of Top Portion of Protrusion>

1) Protrusions in the field of view (12 mm×9 mm) were measured and calculated with a 3D measuring instrument (manufactured by Keyence, VR-3000) at 25× magnification.

2) The measured data was opened with the attached analysis software, and a curvature correction was performed. The correction condition was set to quadratic surface correction.

3) A reference surface was set. The reference surface was set automatically by specifying an area.

4) The threshold was set. The guideline for the threshold was from ½ to ⅓ of the protrusion height, for example, from 0.15 mm to 0.3 mm. This time, the threshold value in Table 1 was set to 0.25 mm.

5) The measurement results were viewed. The number of protrusions can be measured from the number of protrusions in a region with a height exceeding the sum of the center of the display range (described below) and the threshold. The number of protrusions is defined as the total number of protrusions existing in the field of view minus half the number of protrusions on the boundary of the field of view.

6) From the measured 3D data, the sectional area (corresponding to the projected area of a constricted protrusion or the actual sectional area of a mountain-shaped protrusion which is not constricted and of which the bottom portion has a bigger diameter than the top portion thereof) of each protrusion at the sum of the center of the display range and the threshold value of each protrusion was derived, and the area ratio $S_t$ of the top portions of the protrusions was calculated by dividing the total area of these protrusions by the measured area, and the average area per protrusion was calculated by dividing the total area of protrusions by the number of protrusions, from which the average diameter $d_{pav}$ of the top portion of the protrusion was obtained.

<$H_{av}$, $\Delta H$>

1) Each protrusion height is the sum of the center of the display range+the threshold value+the maximum height. The average value of each protrusion height in the field of view was defined as the average protrusion height $H_{av}$. The center of the display range is a parameter that is automatically determined according to the properties of a cylinder liner, and represents the height of the protrusion from the outer periphery of the cylinder liner base to the reference plane. The threshold value represents the height from the reference plane, and the maximum height represents the height from the threshold value to the tip of the protrusion, with each protrusion having a different height.

2) The maximum value minus the minimum value of protrusion height in each field of view was defined as the protrusion height variation $\Delta H$.

<Average Surface-to-Surface Distance $P_{av}$ Between Top Portions of Protrusions>

The method of measuring the average surface-to-surface distance $P_{av}$ between top portions of the protrusions was carried out by the following procedure.

1) Protrusions were arranged in the measurement field of view, assuming that adjacent protrusions were equally coordinated in six positions. After the protrusions were arranged in six coordinates, the distance from the center of a protrusion to the center of an adjacent protrusion was calculated from the area ratio $S_t$ of the top portions of the protrusions and the average diameter $d_{pav}$ of the top portion of the protrusion.

2) By subtracting $d_{pav}$ from the distance from the center of a protrusion to the center of an adjacent protrusion, the average surface-to-surface distance $P_{av}$ between the top portions of the protrusions was calculated.

By measuring in such a procedure, the characteristics of the cylinder liner can be more easily evaluated.

The constriction rate of protrusion, the area ratio $S_t$, the average diameter $d_{pav}$, $H_{av}$, $\Delta H$, and the average surface-to-surface distance $P_{av}$ between top portions of protrusions were averaged over four locations (four fields of view) per cylinder liner. The four locations are preferably, but not limited to, two opposing locations about 20 mm from both ends of the cylinder liner, and the two locations are preferably displaced by about 90° from each other at both ends.

<Surface Roughnesses Rz and Rsk of Top Portion of Protrusion>

The measurement method of the surface roughness of the top portions of the protrusions was as follows.

1) Data was measured with a laser microscope (manufactured by Keyence, VK-X100) set at 20×objective lens magnification in a manner that any protrusion was positioned at the center of the monitor. At this time, efforts were made to capture a protrusion near a top portion of the curved surface of the cylinder liner base.

2) The measured data was opened with the attached analysis software and the surface inclination correction was carried out. The roughness of the top portion of the protrusion was analyzed using the surface roughness measurement tool. The analysis area was basically set at 300 μm in length and 350 μm in width, and the analysis area did not include the inclined area of the tip of the protrusion. Notably, the roughness will be estimated to be larger than the actual if the analysis area includes the inclined area. When the ends of the protrusions are close to the edge of the observed area, the analysis area may be 200 μm in length and 250 μm in width. The values of Rz and Rsk were read from the analysis results.

3) Rz and Rsk were measured at any five protrusions per cylinder liner, and the average was obtained from the above four locations.

Experiment

Preparation of Coating Agent

The following raw materials were used to prepare a coating agent.

Fire resistant material: diatomaceous earth, from 18 to 30%

Average particle diameter of diatomaceous earth: from 0.021 to 0.034 mm

Binder: bentonite, from 4 to 8%

Surfactant: from 0.003 to 0.02%

Water: from 65 to 75%

Preparation of Cylinder Liner

Cylinder liners of Examples and Comparative Examples were prepared by centrifugal casting using molten metal of the following composition. The composition of the cast cylinder liners was as follows:

C: 3.4% by mass,
Si: 2.4% by mass,
Mn: 0.7% by mass,
P: 0.12% by mass,
S: 0.035% by mass,
Cr: 0.25% by mass, and
Balance: Fe and inevitable impurities Z (equivalent to JIS FC250).

The cylinder liners for Examples 1 to 10 and Comparative Examples 1 to 5 shown in Table 1 were prepared. In all cases, the temperature of the cylindrical mold in Process C was changed appropriately in the range of from 220 to 280° C., and a coating agent layer was formed with Gno (lining) of from 40 to 70 G. However, the thickness of the coating agent layer was changed in the range of from 0.7 to 1.3 mm to change the protrusion height accordingly. From Process D onwards, cast iron was cast at a Gno (casting) of from 100 to 130 G and a mold temperature of from 200 to 260° C. The inner surface of the obtained cast iron cylindrical member was cut and the wall thickness was adjusted.

The dimensions of the cast iron cylindrical member thus obtained were 86 mm in outer diameter (outer diameter including the height of the protrusion) and 77 mm in inner diameter, and the axial length, excluding chamfered portions, was 133 mm. The properties of the protrusions of the prepared cylinder liners are shown in Table 2.

TABLE 1

| | Area ratio of top portion of protrusion St [%] | Average diameter of top portion of protrusion $d_{pav}$ [mm] | Average protrusion height Hav [mm] | Protrusion height variation ΔH [mm] | Average surface-to-surface distance Pav [mm] | V/A [mm] | Molten metal running index YI | Surface roughness of top portion of protrusion Rz [μm] | Joining strength evaluation* |
|---|---|---|---|---|---|---|---|---|---|
| Example 1 | 8.1 | 0.70 | 0.49 | 0.11 | 1.644 | 0.45 | 2.2 | 32.0 | A |
| Example 2 | 20.2 | 0.80 | 0.50 | 0.22 | 0.897 | 0.40 | 9.0 | 69.0 | A |
| Example 3 | 31.9 | 1.08 | 0.49 | 0.18 | 0.739 | 0.33 | 14.4 | 58.4 | A |
| Example 4 | 20.4 | 1.32 | 0.49 | 0.18 | 1.459 | 0.39 | 5.5 | 50.5 | A |
| Example 5 | 15.8 | 0.83 | 0.59 | 0.25 | 1.163 | 0.50 | 6.8 | 60.8 | A |
| Example 6 | 10.1 | 0.93 | 0.56 | 0.12 | 1.849 | 0.51 | 2.8 | 24.3 | A |
| Example 7 | 34.5 | 1.31 | 0.51 | 0.19 | 0.816 | 0.34 | 14.3 | 33.3 | A |
| Example 8 | 9.2 | 1.08 | 0.72 | 0.13 | 2.304 | 0.66 | 2.6 | 68.3 | A |
| Example 9 | 15.3 | 0.75 | 0.70 | 0.21 | 1.070 | 0.60 | 8.6 | 74.8 | A |
| Example 10 | 23.1 | 0.91 | 0.72 | 0.16 | 0.892 | 0.56 | 14.5 | 53.6 | A |
| Comparative Example 1 | 6.9 | 0.62 | 0.49 | 0.21 | 1.623 | 0.46 | 2.0 | 78.3 | B |
| Comparative Example 2 | 35.8 | 1.25 | 0.49 | 0.18 | 0.742 | 0.32 | 15.3 | 75.2 | C |
| Comparative Example 3 | 7.1 | 1.00 | 0.70 | 0.16 | 2.580 | 0.66 | 1.8 | 80.4 | C |

TABLE 1-continued

|  | Area ratio of top portion of protrusion St [%] | Average diameter of top portion of protrusion $d_{pav}$ [mm] | Average protrusion height Hav [mm] | Protrusion height variation ΔH [mm] | Average surface-to-surface distance Pav [mm] | V/A [mm] | Molten metal running index YI | Surface roughness of top portion of protrusion Rz [μm] | Joining strength evaluation* |
|---|---|---|---|---|---|---|---|---|---|
| Comparative Example 4 | 25.3 | 0.70 | 0.71 | 0.27 | 0.629 | 0.54 | 21.6 | 105.0 | C |
| Comparative Example 5 | 20.2 | 0.86 | 0.89 | 0.32 | 0.959 | 0.72 | 15.2 | 101.6 | C |

*Preparation of Cylinder Block

Using the cylinder liners of Examples 1 to 10 and Comparative Examples 1 to 5, joined bodies of cylinder liners and cylinder blocks were manufactured under the following conditions, and the void area ratio of the resulting cylinder blocks and the joining strength with the cylinder liners were evaluated. In one cylinder, at least eight circumferentially equally divided measurement samples were made, and the measurement samples each included a closest portion with adjacent cylinders.
Casting Method: Sand Mold Gravity Casting
Aluminum Material AC4

The resulting joined bodies of the cylinder liner and the cylinder block were measured for the porosity of the cylinder block using the following method.

i) A sample containing an interface between the cylinder liner and the block aluminum was cut out, and the section was ground and polished.

ii) After grinding and polishing, three consecutive photographs were taken with a metallurgical microscope, including the above-described interface. The photographic magnification was set to 100×.

iii) After the photographs were taken, a portion including voids were extracted by binarization using image analysis software (Motic Images Plus 2, 3S), and the void area ratio (the ratio (%) of gap at the interface to the photographic field of view) of the photographs was measured, and the average was taken as the void area ratio. The relationship between the porosity and the molten metal running index YI is shown in FIG. 4.

Next, the joining strength between the cylinder liner and the cylinder block was measured by the following method.

Using a tensile tester (manufactured by Shimadzu Corporation, universal testing machine: AG-5000E), either the cylinder liner or the cylinder block which was cut out to make the joining surface about 20 mm×20 mm was fixed by a clamp, and the other side was subjected to a tensile load in a direction perpendicular to the joining surface of the two members. The tensile strength of the two members when they separated was defined as the joining strength. This was performed for eight locations in the circumferential direction of the cylinder liner, and those with a minimum joining strength of 1.0 MPa or greater were considered to be good (A). When the average value of the joining strength was 1.0 MPa or more, but the minimum joining strength was less than 1.0 MPa, the evaluation was classified as (B), and when the average value of the joining strength was less than 1.0 MPa, the evaluation was classified as (C). The relationship between the porosity and the joining strength is shown in FIG. 5.

From FIGS. 4 and 5, it can be understood that in order to obtain a favorable joining strength between the cylinder liner and the cylinder block, the porosity of the cylinder block is preferably 5.0% or less. It can be understood that in order to form a cylinder block having a desired porosity, it is preferable to use a cylinder liner having a molten metal running index YI of 2.2 or more.

REFERENCE SIGNS LIST

10, 20 Constricted protrusion
11, 21 Outer peripheral surface of base
6 coordinated virtual protrusions

The invention claimed is:

1. A cylinder liner for insert casting of a cylinder block by flowing molten metal over an outer periphery of a base of the cylinder liner, the cylinder liner including the base and a plurality of protrusions on the outer periphery of the base, wherein a distance between adjacent protrusions, an area of top portions of protrusions, and a space between the top protrusions and the outer periphery of the base are selected such that a molten metal running index YI as defined by the following Formula is 2.2 or more and 14.5 or less, wherein: YI=[area ratio $S_t$ (%) of top portions of protrusions×molten metal infiltration volume V (mm$^3$)/outer peripheral surface area A (mm$^2$) of cylinder liner base]/[average surface-to-surface distance $P_{av}$ (mm) between the top portions of the protrusions], the area ratio $S_t$ of the top portions of the protrusions is a projected area ratio of the protrusions viewed from an outer peripheral side of the cylinder liner in a height direction of the protrusions, the molten metal infiltration volume V is represented by V=α−β−(γ×δ), where α=π×(outermost diameter $d_{max}$ (mm) of the cylinder liner including the protrusions/2)$^2$×axial length L (mm) of cylinder liner, β=π×(outer diameter d (mm) of cylinder liner base/2)$^2$×axial length L (mm) of cylinder liner, γ=Number of protrusions per unit area×[(outer diameter d (mm) of cylinder liner base×π×axial length L (mm) of cylinder liner)/unit area (mm$^2$)], and δ=π×(average diameter $d_{pav}$ (mm) of the top portions of the protrusions/2)$^2$×average protrusion height $H_{av}$ (mm), and when an end or ends of the cylinder liner is or are chamfered, the axial length L of the cylinder liner is defined as the length of the cylinder liner minus a length of chamfered portions of the end or ends of the cylinder liner.

2. The cylinder liner for insert casting according to claim 1, wherein the area ratio $S_t$ (%) of the top portions of the protrusions is 8 or more and 35 or less.

3. The cylinder liner for insert casting according to claim 1, wherein the average surface-to-surface distance $P_{av}$ (mm) between the top portions of the protrusions is 0.7 or more and 2.3 or less.

4. The cylinder liner for insert casting according to claim 1, wherein the average diameter $d_{pav}$ (mm) of the top portions of the protrusions is 0.7 or more and 1.3 or less.

5. The cylinder liner for insert casting according to claim 1, wherein the plurality of protrusions have a height variation ΔH (mm) of 0.3 or less.

6. The cylinder liner for insert casting according to claim 1, wherein the plurality of protrusions have a surface roughness Rz (μm) of the top portions of the protrusions of 100 or less.

* * * * *

UNITED STATES PATENT AND TRADEMARK OFFICE
CERTIFICATE OF CORRECTION

PATENT NO. : 11,141,783 B1
APPLICATION NO. : 17/246799
DATED : October 12, 2021
INVENTOR(S) : Yasutomo Tokairin et al.

It is certified that error appears in the above-identified patent and that said Letters Patent is hereby corrected as shown below:

On the Title Page

At Item (73), Line 1, "IPR" should be -- TPR --.

Signed and Sealed this
Second Day of August, 2022

Katherine Kelly Vidal
*Director of the United States Patent and Trademark Office*